United States Patent
Palanigounder

(10) Patent No.: US 10,178,549 B2
(45) Date of Patent: *Jan. 8, 2019

(54) AUTHENTICATION AND KEY AGREEMENT WITH PERFECT FORWARD SECRECY

(71) Applicant: QUALCOMM Incorporated, San Diego, CA (US)

(72) Inventor: Anand Palanigounder, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/708,174

(22) Filed: Sep. 19, 2017

(65) Prior Publication Data

US 2018/0020347 A1    Jan. 18, 2018

Related U.S. Application Data

(62) Division of application No. 14/825,988, filed on Aug. 13, 2015, now Pat. No. 9,801,055.
(Continued)

(51) Int. Cl.
*H04L 9/32* (2006.01)
*H04W 12/04* (2009.01)
(Continued)

(52) U.S. Cl.
CPC ............. *H04W 12/04* (2013.01); *H04L 9/085* (2013.01); *H04L 9/0841* (2013.01);
(Continued)

(58) Field of Classification Search
CPC ...... H04W 12/04; H04W 12/06; H04L 9/085; H04L 9/3066; H04L 63/0428;
(Continued)

(56) References Cited

U.S. PATENT DOCUMENTS

| 8,683,570 B1* | 3/2014 | van Dijk ................. G06F 21/35 |
| | | 726/9 |
| 8,837,741 B2 | 9/2014 | Hawkes et al. |

(Continued)

FOREIGN PATENT DOCUMENTS

| EP | 0779570 A1 * | 6/1997 | ........... G06F 21/445 |
| EP | 1079565 A2 | 2/2001 | |
| WO | 2014047135 A2 | 3/2014 | |

OTHER PUBLICATIONS

Adrian Escott Qualcomm Incorporated: "Simplification of Bootstrapping Procedures", 3GPP2 Draft, S40-20050926-006_Qc_Simplfications_Of_Bootstrapping_Procedures, 3rd Generation Partnership Project 2, 3GPP2, 2500 Wilson Boulevard, Suite 300, Arlington, Virginia, 22201, USA, vol. TSGS Sep. 27, 2005 (Sep. 27, 2005), pp. 1-7, XP062188344, Retrieved from the Internet: URL: http://ftp.3gpp2.org/TSGS/Working/_2005/2005-09-Vancouver/WG 4 Security/ [retrieved on Sep. 27, 2005] p. 2-p. 2 figures 1-4.
(Continued)

*Primary Examiner* — Mohammad W Reza
(74) *Attorney, Agent, or Firm* — Jae-Hee Choi; Hunter Clark

(57) ABSTRACT

Systems and methods for providing authentication key agreement (AKA) with perfect forward secrecy (PFS) are disclosed. In one embodiment, a network according to the disclosure may receive an attach request from a UE, provide an authentication request including a network support indicator to a network resource, receive an authentication token from the network resource, such that the authentication token includes an indication that a network supports PFS, provide the authentication token to the UE, receive an authentication response including a UE public key value, obtain a network public key value and a network private key value, determine a shared key value based on the network private key value and the UE public key value, bind the
(Continued)

shared key value with a session key value to create a bound shared key value, and use the bound shared key value to protect subsequent network traffic.

20 Claims, 9 Drawing Sheets

Related U.S. Application Data

(60) Provisional application No. 62/140,426, filed on Mar. 30, 2015, provisional application No. 62/140,331, filed on Mar. 30, 2015.

(51) Int. Cl.
*H04L 29/06* (2006.01)
*H04L 9/08* (2006.01)
*H04L 9/30* (2006.01)
*H04W 12/06* (2009.01)

(52) U.S. Cl.
CPC .......... *H04L 9/0891* (2013.01); *H04L 9/3066* (2013.01); *H04L 9/3242* (2013.01); *H04L 63/0428* (2013.01); *H04L 63/067* (2013.01); *H04W 12/06* (2013.01); *H04L 63/0869* (2013.01)

(58) Field of Classification Search
CPC ... H04L 9/3242; H04L 9/0841; H04L 9/0891; H04L 63/067; H04L 63/0869
USPC .......................................................... 713/171
See application file for complete search history.

(56) References Cited

U.S. PATENT DOCUMENTS

| | | | |
|---|---|---|---|
| 8,848,904 B2 | 9/2014 | Baras et al. | |
| 2003/0163565 A1* | 8/2003 | Jiang | H04L 47/14 709/225 |
| 2006/0123122 A1* | 6/2006 | Jung | H04L 67/14 709/227 |
| 2012/0039474 A1 | 2/2012 | Ho | |
| 2012/0331289 A1 | 12/2012 | Benshetler et al. | |
| 2014/0072119 A1 | 3/2014 | Hranilovic et al. | |
| 2014/0201809 A1 | 7/2014 | Choyi et al. | |
| 2017/0006469 A1 | 1/2017 | Palanigounder | |

OTHER PUBLICATIONS

Huang Yi-Li., et al., "A Secure Wireless Communication System Integrating PRNG and Diffie-Hellman PKDS by Using a Data Connection Core", 2013 Eighth International Conference on Broadband and Wireless Computing, Communication and Applications, IEEE, Oct. 28, 2013 (Oct. 28, 2013), pp. 360-365, XP032536726, DOI:10_1109/BWCCA.2013.63 [retrieved on Dec. 20, 2013] abstract; figure 1 paragraph [02.2] paragraph [0003].
International Search Report and Written Opinion—PCT/US2016/020545—ISA/EPO—dated Aug. 25, 2016.
Partial International Search Report—PCT/US2016/020545—ISA/EPO—dated Jun. 17, 2016.

* cited by examiner

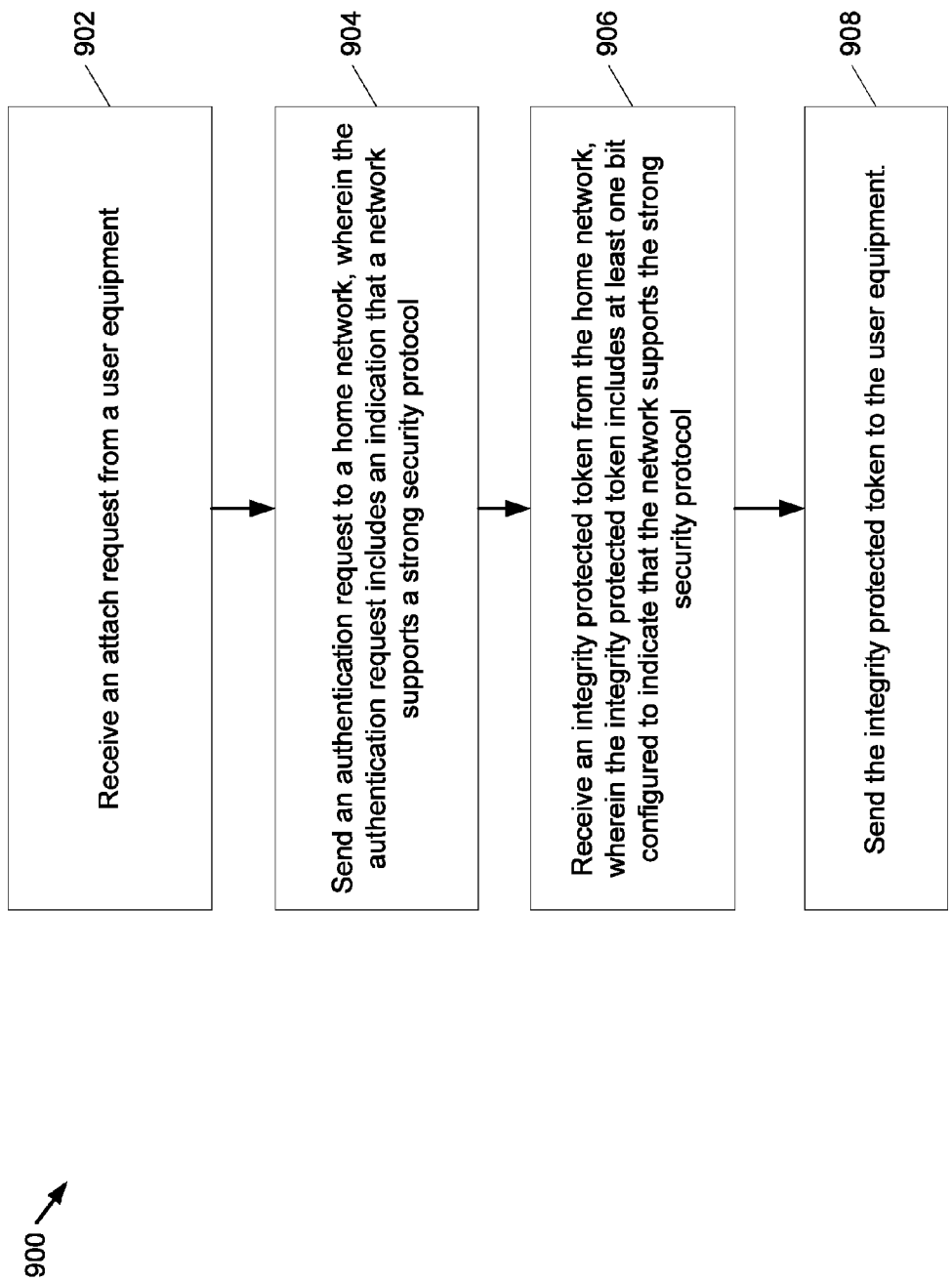

AUTHENTICATION AND KEY AGREEMENT WITH PERFECT FORWARD SECRECY

CROSS-REFERENCE TO RELATED APPLICATIONS

This application is a divisional of U.S. patent application Ser. No. 14/825,988, entitled "Authentication and Key Agreement with Perfect Forward Secrecy," filed on Aug. 13, 2015, which claims the benefit of U.S. Provisional Application No. 62/140,331, entitled "Authentication and Key Agreement with Perfect Forward Secrecy," filed on Mar. 30, 2015, and U.S. Provisional Application No. 62/140,426, entitled "Authentication and Key Agreement with Perfect Forward Secrecy," filed on Mar. 30, 2015, each of which is assigned to the assignee hereof and the contents of which are incorporated herein by reference in their entirety.

BACKGROUND

In general, a wireless communication system may facilitate authentication procedures between a network and a device attempting to access the network. Different networks may have different authentication procedures. A device may include security credentials used to authenticate the device prior to providing access to the network. In some systems, confidential communications may utilize security credentials that are stored in a module on the device, and that couple the device to a host network. For example, the widely used Authentication and Key Agreement (AKA) protocol relies on a symmetric root key (K) that is securely shared between the device (e.g., a removable Universal Subscriber Identity Module (USIM)) and the network (e.g., Home Subscriber Server (HSS)). Other networks may be capable of providing other types of cryptographic assurances to realize secure exchanges.

In existing wireless networks that use AKA, there is a risk that if a long term root key (e.g., K) is compromised, the confidentiality of all past communications may be compromised. That is, an attacker may capture past encrypted communications and decrypt it once the long-term rook key (K) is compromised. There is also a risk that networks which are capable of providing different levels of cryptographic assurances (e.g., weak and strong), may be vulnerable to a man-in-the-middle attack such that a strong cryptographic assurance may be bid down to a weaker solution.

BRIEF SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

An example of a method for providing an authentication and key agreement protocol with perfect forward secrecy (PFS) between a user equipment and a network according to the disclosure includes generating, with the user equipment, an attach request, receiving, with the user equipment, an authentication token, such that the authentication token includes an indication of PFS support by the network, determining, with the user equipment, that the network supports PFS, providing, with the user equipment, a UE public key value to the network, receiving, with the user equipment, a network public key value from the network, determining, with the user equipment, a shared key value based on the network public key value and a UE private key value, binding, with the user equipment, the shared key value with a session key value to create a bound shared key value, and utilizing, with the user equipment, the bound shared key value to protect subsequent network traffic.

Implementations of such a method may include one or more of the following features. The attach request may include an indication that the user equipment supports PFS. Generating at attach request may include one of a service request, tracking area request or location update request. Binding the shared key value with the session key value may include determining a cryptographic hash of the shared key value and the session key value. The session key value may be $K_{ASME}$, Cipher Key (CK) or Integrity Key (IK). Providing the UE public key value to the network may include generating an ephemeral Diffie-Hellman pair using elliptic-curve cryptography, or using finite field arithmetic. Determining that the network does not support PFS and refusing a connection to the network. The authentication token may include an authentication management field (AMF) bit value is set to 1 to indicate that the network supports PFS.

An example apparatus for providing an authentication and key agreement protocol with perfect forward secrecy (PFS) between user equipment (UE) and a network according to the disclosure includes a memory, at least one processor operably coupled to the memory and configured to receive an attach request from a UE, provide an authentication request including a network support indicator to a network resource, receive an authentication token from the network resource, such that the authentication token includes an indication that a network supports PFS, provide the authentication token to the UE, receive an authentication response including a UE public key value, deny the attach request if the authentication response is not an expected response, if the authentication response is the expected response, then obtain a network public key value and a network private key value, determine a shared key value based on the network private key value and the UE public key value, bind the shared key value with a session key value to create a bound shared key value, and use the bound shared key value to protect subsequent network traffic.

Implementations of such an apparatus may include one or more of the following features. The authentication token may be integrity protected between the UE and the network resource. An attach request received from the UE may include receiving one of a service request, tracking area request or location update request instead of an attach request. A cryptographic hash of the shared key value and the session key value may be determined. The session key value may be at least one of KASME, Cipher Key (CK), or Integrity Key (IK). The shared key value may be determined by one of elliptic-curve cryptology or finite field arithmetic. The attach request may include an indication that the UE supports PFS. The authentication token may include an authentication management field (AMF) bit value is set to 1 to indicate that the network supports PFS.

An example of a method for preventing a bid-down attack on a system with a strong security protocol according to the disclosure includes receiving an attach request from a user equipment, sending an authentication request to a home network, such that the authentication request includes an indication that a network supports the strong security protocol, receiving an integrity protected token from the home network, such that the integrity protected token includes at least one bit configured to indicate that the network supports the strong security protocol, and sending the integrity protected token to the user equipment.

Implementations of such a method may include one or more of the following features. The attach request may include an indication that the user equipment supports the strong security protocol. The strong security protocol may be an authentication and key agreement protocol with perfect forward secrecy. The authentication request may be a diameter protocol message with Attribute Value Pairs (AVP) as information elements to indicate that the network supports the strong security protocol. The integrity protected token may be included in an authentication vector received from the home network. the at least one bit may be included in an Authentication Management Field (AMF).

An example non-transitory processor-readable storage medium comprising instructions for preventing a bid-down attack on a system with a strong security protocol according to the disclosure includes code for receiving an attach request from a user equipment, code for sending an authentication request to a home network, such that the authentication request includes an indication that a network supports the strong security protocol, code for receiving an integrity protected token from the home network, such that the integrity protected token includes at least one bit configured to indicate that the network supports the strong security protocol, and code for sending the integrity protected token to the user equipment.

Implementations of such a non-transitory processor-readable storage medium may include one or more of the following limitations. the attach request may include an indication that the user equipment supports the strong security protocol. The strong security protocol may be an authentication and key agreement protocol with perfect forward secrecy. The authentication request may be a diameter protocol message with Attribute Value Pairs (AVP) as information elements to indicate that the network supports the strong security protocol. The integrity protected token may be included in an authentication vector received from the home network. The at least one bit may be included in an Authentication Management Field (AMF).

Items and/or techniques described herein may provide one or more of the following capabilities, as well as other capabilities not mentioned. A mobile device may provide an indication to a network to indicate that is supports perfect forward secrecy. A network may provide a home network an information element to indicate that the network supports perfect forward secrecy. An integrity protected token may be generated by the home network and forwarded to the mobile device. The integrity protected token may include an information element to indicate that the network supports prefect forward secrecy. The mobile device and the network may participate in a Diffie-Hellman exchange to generate a shared key. The shared key may be used to bound to a session key. The bound session key may be used to protect subsequent network traffic. An authentication and key agreement protocol with perfect forward secrecy may be realized. The potential for a bid-down attack may be significantly reduced by the use of integrity protected token incorporating network perfect forward secrecy. Other capabilities may be provided and not every implementation according to the disclosure must provide any particular capability, let alone all of the capabilities, discussed. Further, it may be possible for an effect noted above to be achieved by means other than that noted, and a noted item/technique may not necessarily yield the noted effect.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 9 is a block flow diagram of a process for preventing a bid-down attack on a system with a strong security protocol according to some aspects/embodiments.

DETAILED DESCRIPTION

Techniques are discussed for providing authentication and key agreement (AKA) with perfect forward secrecy (PFS). As used herein, the term perfect forward secrecy refers to the cryptography definition of a property of key-agreement protocols to help ensure that a session key derived from a set of long-term keys is not compromised if one of the long-term keys is compromised in the future. The term perfect as used herein does not mean something that is completely free from faults or defects, or as close to such a condition as possible. AKA is a widely used authentication and key agreement protocol in modern cellular networks (e.g., GSM, UMTS, LTE, eHRPD). AKA is specified in 3GPP TS 33.102. The security of AKA generally relies on a symmetric root key (K) that is securely shared between the UE (e.g., typically stored in USIM) and a server in the home network (e.g., Home Subscriber Server (HSS)). AKA does not provide Perfect Forward Secrecy (PFS). That is, AKA does not provide a session key which cannot be compromised if the long term key (e.g., K) is compromised in the future. As will be discussed, in an embodiment, the potential security deficiencies of AKA can be mitigated with PFS properties. For example, an Ephemeral Diffie-Hellman (DHE) exchange may occur between a mobile device and a network server. The mobile device and a network server may each determine individual private key values and public key values. Public keys may be exchanged and combined with respective private keys to generate a shared key. The resulting shared key may be bound to a base-key in an authentication vector (e.g., $K_{ASME}$) and used to protect communications in the network. Secured authentication information elements may be used to ensure that both the mobile device and network server support PFS. The secured authentication bits may prevent bid down attacks (e.g., man-in-the-middle attacks).

Figure 1:
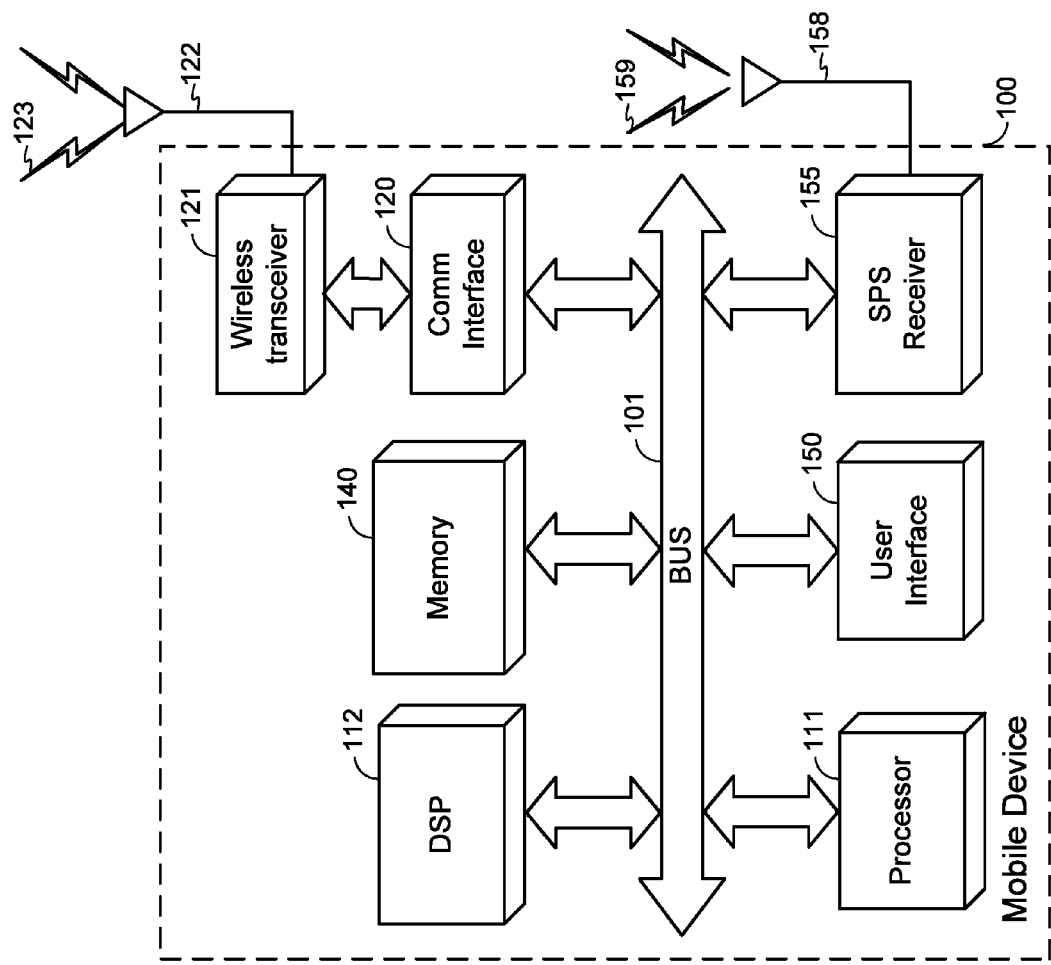
FIG. 1 is a block diagram of components of one embodiment of a mobile device according to some aspects/embodiments.

Referring to FIG. 1, a mobile device 100 is illustrated for which various techniques herein can be utilized. The mobile device 100 is a user equipment (UE) and can include or implement the functionality of various mobile communication and/or computing devices; examples include, but are not limited to, personal digital assistants (PDAs), smartphones, computing devices such as laptops, desktops or tablet computers, automobile computing systems, etc., whether presently existing or developed in the future.

The mobile device 100 includes a processor 111 (or processor core) and memory 140. The mobile device may optionally include a trusted environment operably connected to the memory 140 by the public bus 101 or a private bus (not shown). The mobile device 100 may also include a communication interface 120 and a wireless transceiver 121 configured to send and receive wireless signals 123 via a wireless antenna 122 over a wireless network. The wireless transceiver 121 is connected to a bus 101. Here, the mobile device 100 is illustrated as having a single wireless transceiver 121. However, a mobile device 100 can alternatively have multiple wireless transceivers 121 and wireless antennas 122 to support multiple communication standards such as Wi-Fi, CDMA, Wideband CDMA (WCDMA), Long Term Evolution (LTE), BLUETOOTH short-range wireless communication technology, etc.

The communication interface 120 and/or wireless transceiver 121 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The mobile device 100 may also include a user interface 150 (e.g., display, GUI), and an SPS receiver 155 that receives satellite positioning system (SPS) signals 159 (e.g., from SPS satellites) via an SPS antenna 158. The SPS receiver 155 can communicate with a single global navigation satellite system (GNSS) or multiple such systems. A GNSS can include, but is not limited to, Global Positioning System (GPS), Galileo, Glonass, Beidou (Compass), etc. SPS satellites are also referred to as satellites, space vehicles (SVs), etc. The SPS receiver 155 processes, in whole or in part, the SPS signals 159 and uses these SPS signals 159 to determine the location of the mobile device 100. The processor 111, memory 140, DSP 112 and/or specialized processor(s) (not shown) may also be utilized to process the SPS signals 159, in whole or in part, and/or to calculate the location of the mobile device 100, in conjunction with SPS receiver 155. Storage of information from the SPS signals 159 or other location signals is performed using a memory 140 or registers (not shown). While only one processor 111, one DSP 112 and one memory 140 are shown in FIG. 1, more than one of any, a pair, or all of these components could be used by the mobile device 100. The processor 111 and DSP 112 associated with the mobile device 100 are connected to the bus 101.

The memory 140 can include a non-transitory computer-readable storage medium (or media) that stores functions as one or more instructions or code. Media that can make up the memory 140 include, but are not limited to, RAM, ROM, FLASH, disc drives, etc. In general, the functions stored by the memory 140 are executed by general-purpose processor(s) 111, specialized processors, or DSP(s) 112. Thus, the memory 140 is a processor-readable memory and/or a computer-readable memory that stores software (programming code, instructions, etc.) configured to cause the processor(s) 111 and/or DSP(s) 112 to perform the functions described. Alternatively, one or more functions of the mobile device 100 may be performed in whole or in part in hardware.

A mobile device 100 can estimate its current position within an associated system using various techniques, based on other communication entities within view and/or information available to the mobile device 100. For instance, a mobile device 100 can estimate its position using information obtained from access points (APs) associated with one or more wireless local area networks (LANs), personal area networks (PANs) utilizing a short-range wireless communication technology such as BLUETOOTH or ZIGBEE®, etc., SPS satellites, and/or map constraint data obtained from a map server or LCI server.

Figure 2:
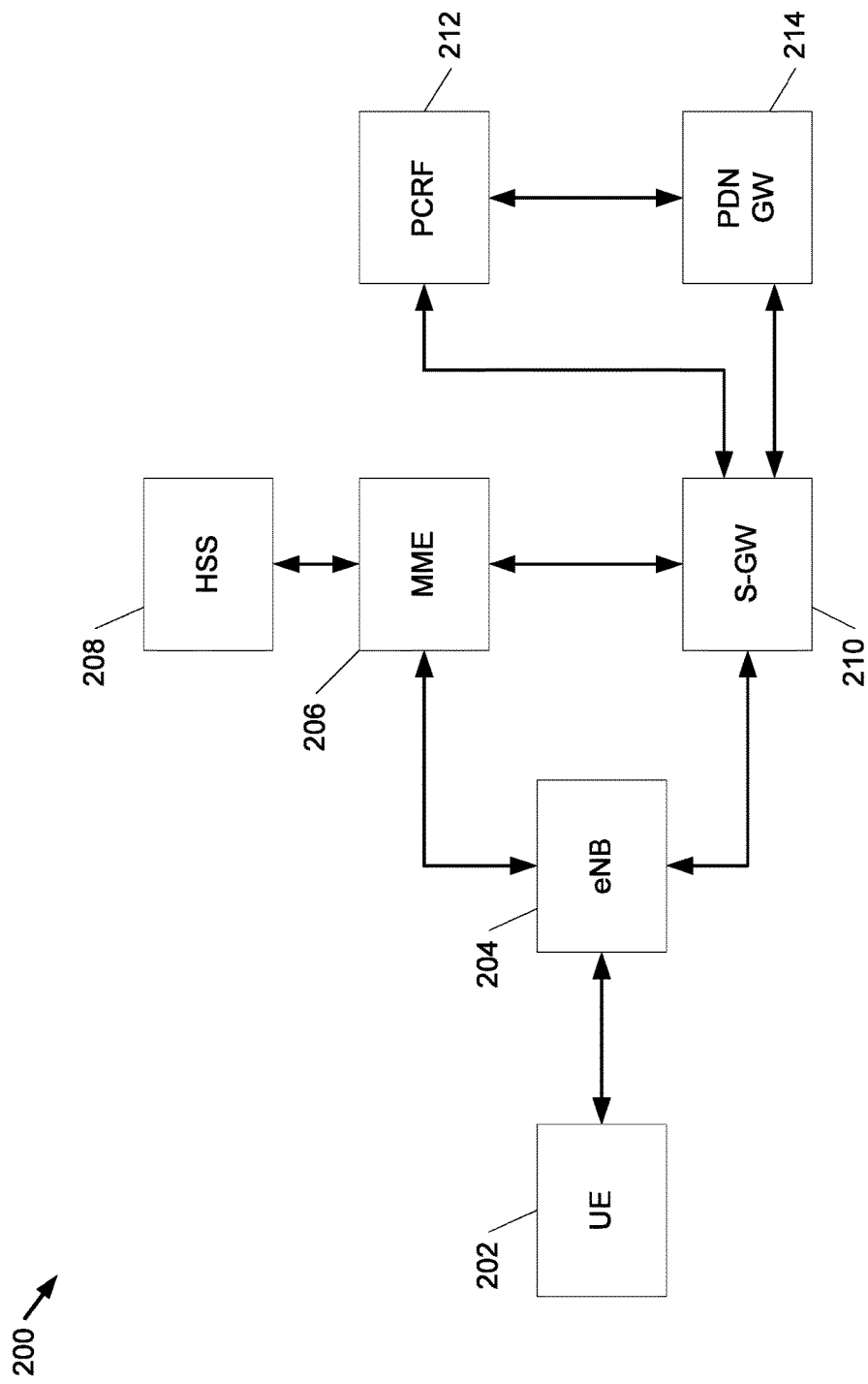
FIG. 2 is a block diagram of an example wireless communication system according to some aspects/embodiments.

Referring next to FIG. 2, a block diagram of an example communication system 200 is shown. The communication system 200 may include a Long Term Evolution (LTE) radio access network (RAN) that provides wireless radio communications between a UE 202 (i.e., a mobile device 100) and an evolved NodeB (eNB) 204 (e.g., a base station, access point, etc.) using LTE radio access technology. The LTE network in FIG. 2 is exemplary only as other networks may be used. For simplicity of discussion, FIG. 2 depicts a UE 202 and one eNB 204, however a RAN may include any number of UEs and/or eNBs. The eNB 204 transmit information to the UE 202 over a forward link or downlink channel and the UE 202 can transmit information to the eNB 204 over a reverse link or uplink channel. As shown, RANs can utilize any suitable type of radio access technology such as, but not limited to, LTE, LTE-A, HSPA, CDMA, high rate packet data (HRPD), evolved HRPD (eHRPD), CDMA2000, GSM, GPRS, enhanced data rate for GSM evolution (EDGE), UMTS, or the like.

The eNB 204 may communicate with a core network that enables charging (e.g., usage charges for services, etc.), security (e.g., ciphering and integrity protection), subscriber management, mobility management, bearer management, QoS handling, policy control of data flows, and/or interconnections with external network. The RAN and core network can communicate via an S1 interface, for instance. The core network can include a mobility management entity (MME) 206 that can be an end-point for control signaling from the serving gateway (S-GW) 210. The MME 206 can provide functions such as mobility management (e.g., tracking), authentication, and security. The MME 206 can communicate with the RAN via the S1 interface. The serving gateway (S-GW) 210 is a user plane node that connects the core network to the LTE RAN. The MME 206 may be configured to communicate with the S-GW 210 via an S11 interface. The MME 206 and S-GW 210 may be configured as a single node to provide a single end-point for user and control signaling originating from a RAN and/or terminating at a RAN. The network may also include a policy and charging rules function (PCRF) 212.

The communication system 200 may also include a packet data network (PDN) gateway (GW) 214 that facilitates communications between the core network (and the RANs) and external networks. The PDN GW 214 may provide packet filtering, QoS policing, charging, IP address allocation, and routing of traffic to external networks. In an example, the S-GW 210 and the PDN GW 214 can communicate via an S5 interface. While illustrated as separate nodes in FIG. 2, it is to be appreciated that the S-GW 210 and PDN GW 214, for example, may be configured to operate as a single network node to reduce user plane nodes in the communication system 200. The communication system 200 may also include a home subscriber services (HSS) entity 208 which may communicate with the MME 206. The communication system 200 may also include other network components, such as a 3GPP authentication, authorization and accounting (AAA) server/proxy and a 3GPP2 AAA server/proxy (not shown) configured to communicate with each other and further communicate with the PDN GW 214 and the HSS 208.

Figure 3:
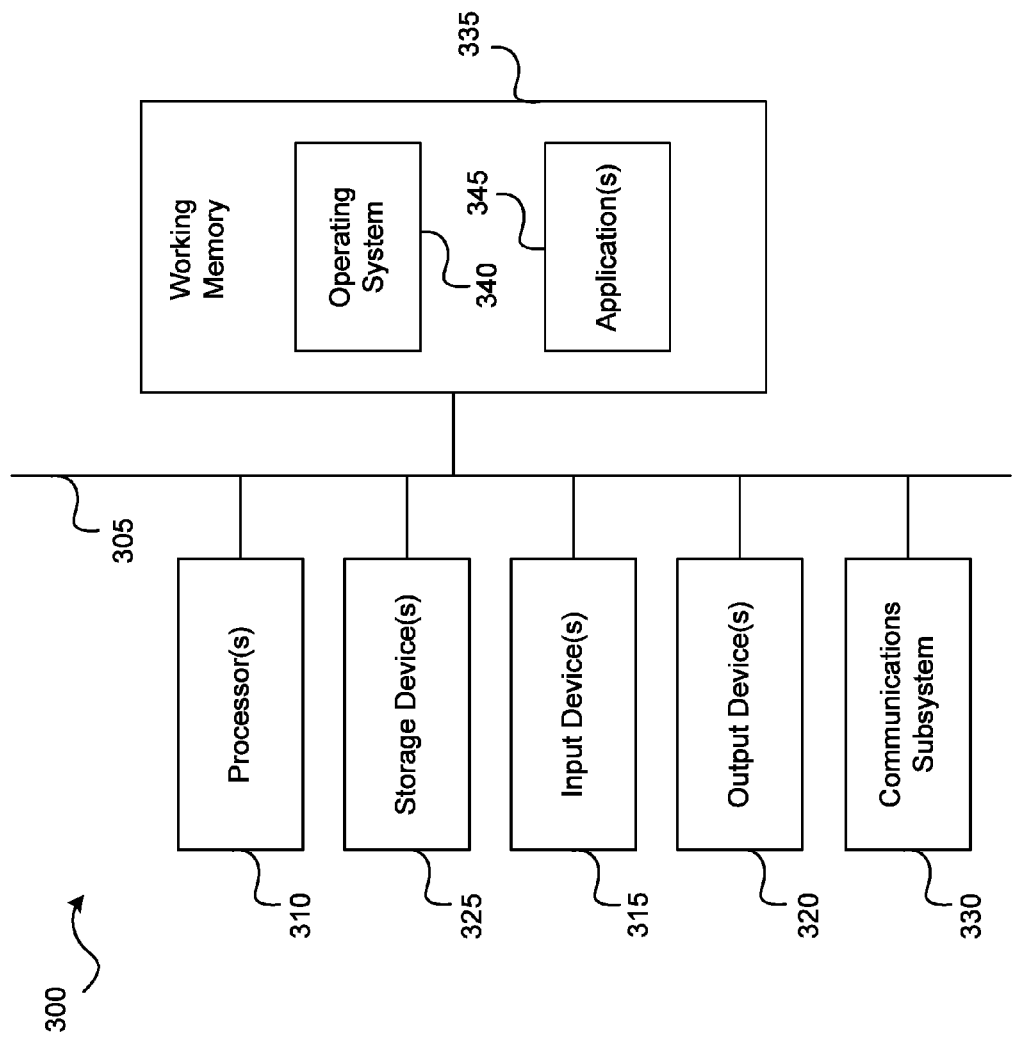
FIG. 3 is a block diagram of an example of a computer system for use in the wireless communication system of FIG. 2 according to some aspects/embodiments.

The communication system 200 may be configured to communicate with external networks via the PDN GW 214. The external networks (not shown) may include networks such as, but not limited to, a public switched telephone network (PSTN), an IP multimedia subsystem (IMS), and/or an IP network. The IP network can be the Internet, a local area network, a wide area network, an intranet, or the like. FIG. 2 is an example of just one possible configuration and many other configurations and additional components may be used in accordance with various aspects and implementations described below. block A computer system 300 as illustrated in FIG. 3 may be utilized to at least partially implement the functionality of the elements in FIG. 2. FIG. 3 provides a schematic illustration of one embodiment of a computer system 300 that can perform the methods provided by various other embodiments, as described herein, and/or can function as a mobile device or other computer system. For example, the eNB 204, MME 206, HSS 208, S-GW 210, PCRF 212, and PDN GW 214 may be comprised of one or more computer systems 300. FIG. 3 provides a generalized illustration of various components, any or all of which may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements may include one or more processors 310, including without limitation one or more general-purpose processors and/or one or more special-purpose processors (such as digital signal processing chips, graphics acceleration processors, and/or the like); one or more input devices 315, which can include without limitation a mouse, a keyboard and/or the like; and one or more output devices 320, which can include without limitation a display device, a printer and/or the like. The processor(s) 310 can include, for example, intelligent hardware devices, e.g., a central processing unit (CPU) such as those made by Intel® Corporation or AMD®, a microcontroller, an ASIC, etc. Other processor types could also be utilized.

The computer system 300 may further include (and/or be in communication with) one or more non-transitory storage devices 325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 300 might also include a communications subsystem 330, which can include without limitation a modem, a network card (wireless or wired), an infrared communication device, a wireless communication device and/or chipset (such as a BLUETOOTH short-range wireless communication technology transceiver/device, an 802.11 device, a WiFi device, a WiMax device, cellular communication facilities, etc.), and/or the like. The communications subsystem 330 may permit data to be exchanged with a network (such as the network described below, to name one example), other computer systems, and/or any other devices described herein. In many embodiments, the computer system 300 will further comprise, as here, a working memory 335, which can include a RAM or ROM device, as described above.

The computer system 300 also can comprise software elements, shown as being currently located within the working memory 335, including an operating system 340, device drivers, executable libraries, and/or other code, such as one or more application programs 345, which may comprise computer programs provided by various embodiments, and/or may be designed to implement methods, and/or configure systems, provided by other embodiments, as described herein. Merely by way of example, one or more processes described herein might be implemented as code and/or instructions executable by a computer (and/or a processor within a computer). Such code and/or instructions can be used to configure and/or adapt a general purpose computer (or other device) to perform one or more operations in accordance with the described methods.

A set of these instructions and/or code might be stored on a computer-readable storage medium, such as the storage device(s) 325 described above. In some cases, the storage medium might be incorporated within a computer system, such as the computer system 300. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.) then takes the form of executable code.

Figure 4:
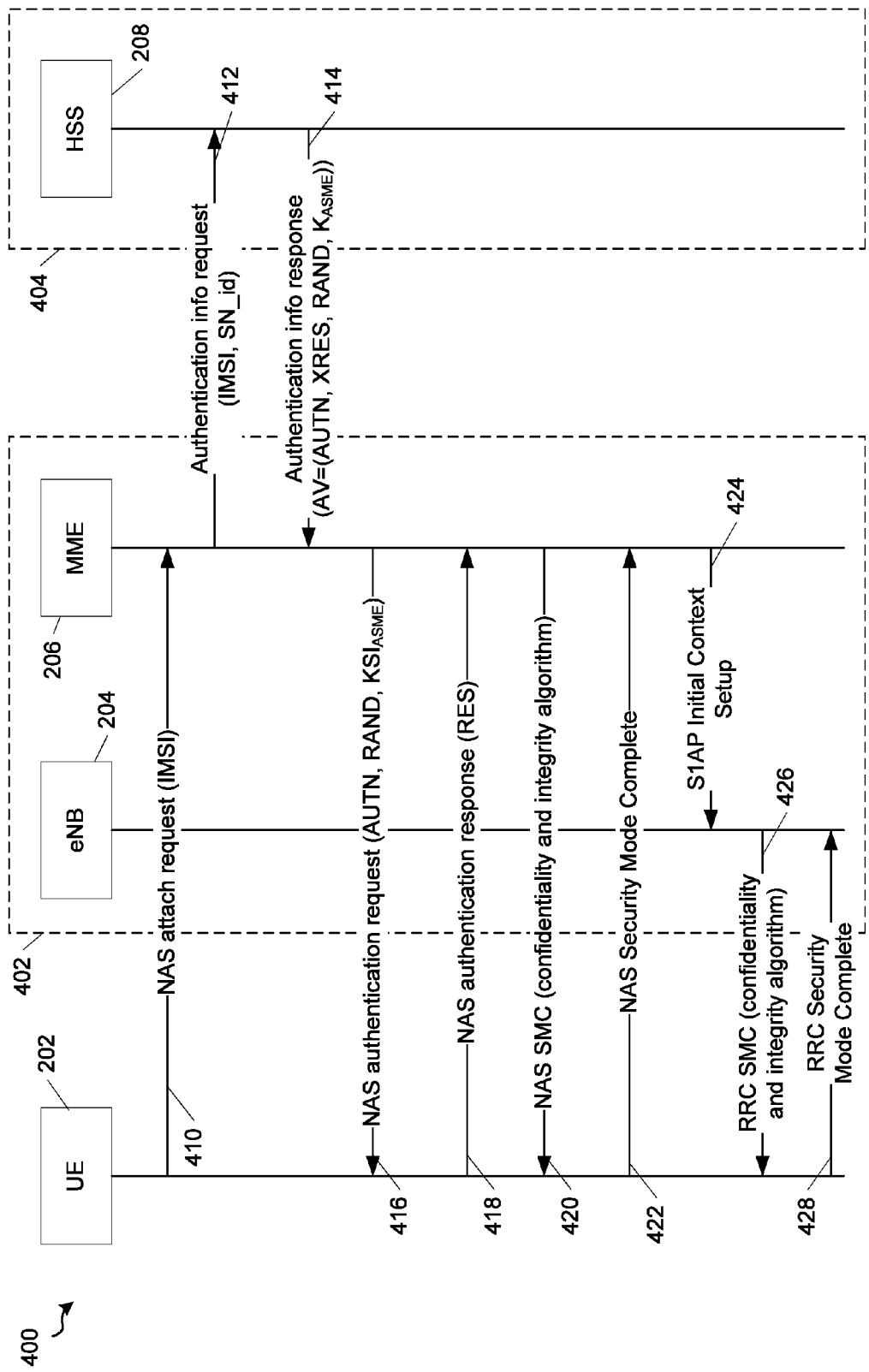
FIG. 4 is a prior art call flow diagram of a 3GPP long term evolution (LTE) authentication procedure.

Referring to FIG. 4, a prior art call flow diagram 400 of a 3GPP long term evolution (LTE) authentication procedure is shown. The prior art call flow diagram 400 complies with published standards, such as 3GPP TS 33.401. The messages indicated in the call flow represent information (e.g., data fields) that is transmitted electrically between computer systems. The information can be of data types as known in the art (e.g., binary, number, char, varchar, date, etc. . . . ). The diagram 400 represents security procedures that may be used by a communication system 200, thus the diagram 400 includes a UE 202 (e.g., a mobile device 100), a network 402, and a home network 404. The network 402 may include an eNodeB (eNB) 204 and an MME 206. The home network 404 includes at least the HSS 208. The call flow diagram 400 illustrates an authentication and key agreement (AKA) procedure for providing credentials on a network. The UE 202 sends the MME 206 (e.g., via the eNB 204) a Non Access Stratum (NAS) request message 410 including an International Mobile Station Equipment Identity (IMSI). The MME 206 is configured to retrieve authentication data from the HSS 208 to perform user authentication. The MME 206 may send the HSS 208 an authentication information request message 412 including the IMSI (e.g., included in the NAS attach request message 410) and a network identity information (SN_id). The SN_id may include a mobile country code and a mobile network code. The authentication information request message 412 may also include data fields indicating a network type (e.g., E-UTRAN) and a number of requested Authentication Vectors (AV) (not shown). The HSS 208 is configured to receive the authentication information request message 412 and generate one or more AVs. In an example, the HSS 208 may request the AVs from an Authentication Center (AuC) (not shown). The AVs include an authentication token (AUTN), an expected response (XRES), a random number (RAND), and a Key Access Security Management Entity ($K_{ASME}$). The $K_{ASME}$ forms the basis for generating Access Stratum (AS) and NAS ciphering and integrity keys for NAS signaling protection and user plane protection. The AVs are provided to the MME 206 in an authentication information response message 414. In other 3GPP networks that use AKA (e.g., UMTS, GSMA), the AVs include an authentication token (AUTN), an expected response (XRES), a random number (RAND), a Cipher Key (CK) and Integrity Key (IK). The CK and IK are used for ciphering and integrity protection of the messages.

The MME 206 may be configured to initiate the authentication of the UE 202 via Evolved Packet System (EPS) protocols. The MME 206 generates a NAS authentication request message 416, including the AUTN an RAND values received from the home network 404, as well as a NAS Key Set Identifier ($KSI_{ASME}$) based on the received $K_{ASME}$ value. The $KSI_{ASME}$ is stored in the UE 202 and the MME 206. The UE 202 is configured to identify the freshness of the AV (e.g., by checking whether the AUTN can be accepted). The UE 202 may then compute a response (RES) value if the verification is accepted (e.g., the AUTN is accepted), and then sends a NAS authentication response message 418 which includes the RES value. If the verification fails, the UE 202 sends an authentication failure message to the MME 206 with a CAUSE value indicating the reason for the failure. The MME 206 is configured to determine if the RES value and the XRES value are equal. If they are equal, the authentication is successful. If they are not equal, the MME 206 may be configured to initiate further identity requests or send an authentication reject message towards the UE 202.

Upon a successful authentication, the MME 206 may be configured to initiate a NAS security mode command (SMC) procedure consisting of a roundtrip message between the MME 206 and the UE 202. The MME 206 sends a NAS Security Mode Command (SMC) message 420 containing confidentiality and integrity algorithms. For example, the NAS SMC message 420 may contain replayed UE security capabilities, selected NAS algorithms, the $KSI_{ASME}$ value for identifying $K_{ASME}$, and both $NONCE_{UE}$ and $NONCE_{MME}$ values in the case of creating a mapped context in idle mobility. The NAS SMC message 420 may be integrity protected (but not ciphered) with NAS integrity key based on $K_{ASME}$ indicated by the $KSI_{ASME}$ value in the message. The UE 202 is configured to verify the integrity of the NAS SMC message 420. This may include ensuring that the UE security capabilities sent by the MME 206 match the ones stored in the UE 202 to ensure that these were not modified by an attacker and checking the integrity protection using the indicated NAS integrity algorithm and the NAS integrity key based on $K_{ASME}$ indicated by the $KSI_{ASME}$ value. If the checks of the NAS Security Mode Command pass, the UE 202 is configured to respond with a NAS Security Mode Complete message 422. The UE 202 is configured to execute NAS integrity protection and ciphering/deciphering and to send the NAS security mode complete message 422 to MME 206 ciphered and integrity protected. The MME 206 is configured to de-cipher and check the integrity protection on the NAS Security Mode Complete message 422 using the keys and algorithms indicated in the NAS Security Mode Command. NAS downlink ciphering at the MME with this security context may start after receiving the NAS security mode complete message 422. NAS uplink deciphering at the MME 206 may start after sending the NAS SMC message 420.

Following the receipt of the NAS security mode complete message 422, the MME 206 may be configured to initiate S1 interface between the eNB 204 and the MME 206 by sending a S1AP initial context setup message 424. In general, the purpose of the initial context setup procedure is to establish the necessary overall initial UE Context including E-UTRAN Radio Access Bearer (E-RAB) context, the Security Key, Handover Restriction List, UE Radio capability and UE Security Capabilities etc. The procedure uses UE-associated signaling. The S1AP initial context setup message 424 may contain a Trace Activation Information Element (IE), a Handover Restriction List IE (which may contain roaming, area or access restrictions), a UE Radio Capability IE, a Subscriber Profile ID for RAT/Frequency priority IE, a CS Fallback Indicator IE, a SRVCC Operation Possible IE, a CSG Membership Status IE, a Registered LAI IE, a GUMMEI ID IE, which indicates the MME serving the UE, a MME UE S1AP ID 2 IE, which indicates the MME UE S1AP ID assigned by the MME, a Management Based MDT Allowed IE, and a Subscriber Profile ID for RAT/Frequency priority IE, if available in the MME. The eNB may be configured to initiate secure communications with the UE 202 via Radio Resource Control (RRC) protocols, such as described in the 3GPP TS 25.331 protocol specification. The eNB may send a RRC SMC message 426 to the UE 202, and the UE 202 may be configured to generate a RRC security mode complete message 428 as described in the specification.

Figure 5:
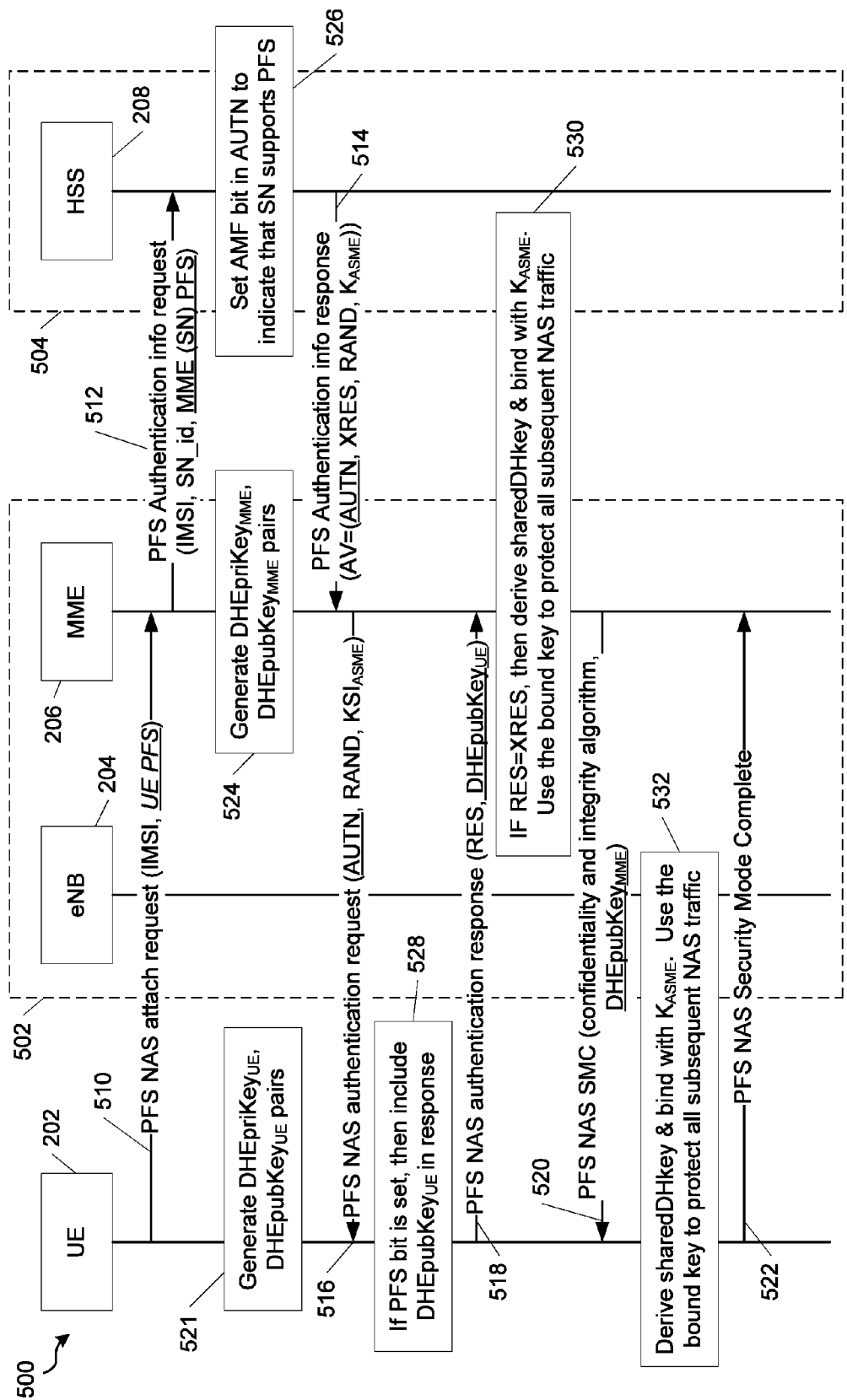
FIG. 5 is a call flow diagram of an example authentication procedure with a perfect forward secrecy (PFS) property according to some aspects/embodiments.

Referring to FIG. 5, with further reference to FIG. 2, a call flow diagram 500 of an example authentication procedure with perfect forward secrecy (PFS) is shown. The diagram 500 represents security procedures that may be used by a communication system 200, thus the diagram 500 includes a UE 202 (e.g., a mobile device 100), a network 502, and a home network 504. The network 502 may include an eNodeB (eNB) 204 and an MME 206. The home network 504 includes at least the HSS 208 that is assumed to support AKA with a PFS property. The call flow diagram 500 improves the authentication and key agreement (AKA) procedure described in FIG. 4 by adding a perfect forward secrecy (PFS) property. The new or improved fields in the diagram 500 (e.g., as compared to the call flow in FIG. 4) are labeled with a 'PFS' prefix and highlighted in the diagram 500 with underlining. Optional elements are indicated in italics. The new computational procedures (e.g., stages) in the diagram 500 are indicated in the respective process boxes.

The UE 202 may be configured to send a PFS NAS attach request 510 to the MME 206. The PFS NAS attach request 510 includes identifying information (e.g., IMSI) and may optionally also include a UE PFS Information Element (IE). The UE PFS IE may be a boolean data bit, or any data type to indicate that the UE 202 is capable of processing AKA with a PFS property. The UE PFS IE is optional, however, as the UE's ability to process AKA with a PFS property may be established in other ways (e.g., via information elements present in other message exchanges). Upon receipt of the request, the MME 206 is configured to request authentication vectors from the home network 504 (e.g., the HSS 208). The MME 206 generates a PFS authentication info request message 512 including the UE security information (e.g., IMSI), data fields indicating a network type (e.g., E-UTRAN), and an indication that the network 502 supports a PFS property (e.g., a MME (SN) PFS informational element). The PFS authentication info request message 512 is typically a diameter protocol message with Attribute Value Pairs (AVP) as informational elements. The MME (SN) PFS informational element may be a Boolean value, or other data value, and is used to indicate that the network 502 supports the PFS property. This indication may be used to help prevent man-in-the-middle (MiM) attacks. That is, a malicious station which intercepts the PFS NAS attach request 510 cannot merely forward the PFS NAS attach request message to the home network 504 without the MME (SN) PFS information element and attempt to force the UE to use the AKA protocol without PFS property.

The HSS 208 is configured to receive the PFS authentication info request message 512 and determine if the network 502 supports the PFS property. If PFS is supported, at stage 526 the HSS 208 is configured to generate an authentication token (AUTN). In this case, a field in the Authentication Management Field (AMF) in the authentication token (AUTN) is set to indicate that the network 502 supports the PFS property (e.g., a Boolean bit is set to 1). This may be referred to as the PFS bit. If the network 502 does not support the PFS property, then the PFS bit is set to an value to indicate that PFS is not supported and the standard AKA protocol will be used (e.g., the Boolean bit is set to zero). The HSS 208 generates a PFS authentication info response message 514 including an Authentication Vector (AV). The AV in the PFS authentication info response message 514 includes the authentication token with the PFS bit described above, (AUTN), the expected response (XRES) value, the random number (RAND) value, and the Key Access Security Management Entity ($K_{ASME}$) value.

The UE 202 and the MME 206 are configured to generate respective pairs of public and private Ephemeral Diffie-Hellman (DHE) keys at stages 521 and 524, respectively. The Diffie-Hellman pairs may be generated, for example, using elliptical curve cryptography or finite field arithmetic. As an example, and not a limitation, the DHE pairs may be as described in U.S. Pat. No. 4,200,770, filed on Sep. 6, 1977, and titled "Cryptographic Apparatus and Method." The UE 202 is configured to generate a UE private key value (DHEpriKey$_{UE}$) and a UE public key value (DHEpubKey$_{UE}$). The MME 206 is configured to generate a MME private key value (DHEpriKey$_{MME}$) and a MME public key value (DHEpubKey$_{MME}$). The private keys (DHEpriKey$_{UE}$, DHEpriKey$_{MME}$) are typically generated using a cryptographically secure pseudo-random number generator (CSPRNG), but other confidential (and preferably non-deterministic) information available to the respective systems may be used. The corresponding public keys are also generated by the respective systems. The DHE key pairs may be selected and generated (e.g., precomputed) in advance by the UE 202 and the MME 206 to reduce the impact of a potential network attack (e.g., processing delays due to generating the DHE keys). It should be noted that the UE may generates its DHE pairs any time before stage 521 and the MME may generates its DHE pairs at any time before stage 530 or in stage 530.

The UE 202 and the MME 206 are configured to exchange their public keys during AKA authentication procedures and each derive a shared key (e.g., sharedDHkey). For example, the MME 206 generates a PFS NAS authentication request message 516 including the AUTN and RAND values received from the HSS 208, as well as a NAS Key Set Identifier (KSI$_{ASME}$) based on the received $K_{ASME}$ value. At stage 528, if the UE 202 is capable of processing a PFS property, the UE 202 is configured to determine if the PFS bit in the AUTN value indicates the PFS property is supported. If the UE 202 is not configured to support a PFS property, the message exchange may continue under the standard AKA procedures (e.g., the UE sends the NAS authentication response message 418 described in FIG. 4). The UE 202 is also configured to determine if the AUTN value is fresh, as previously described. If the AUTN value is accepted, and the PFS bit is set, then the UE 202 computes a RES value and provides a PFS NAS authentication response message 518 to the MME 206, including the RES value and the UE public key value (i.e., DHEpubKey$_{UE}$). If the AUTN value is accepted, but the PFS bit is not set (e.g., value of zero), then the UE 202 may decide to abort the connection procedures with the network that does not support PFS property or may compute and send the RES in accordance with standard AKA procedures (e.g., the UE sends the NAS authentication response message 418 described in FIG. 4). If the AUTN verification fails, the UE 202 sends an authentication failure message to the MME 206 with a CAUSE value indicating the reason for the failure.

Upon receipt of the PFS NAS authentication response message 518, at stage 530 the MME 206 is configured to determine if the RES value equals the XRES value, and then derive a Diffie-Hellman shared key (i.e., sharedDHEkey) based on the received UE public key (i.e., DHEpubKey$_{UE}$). It should be appreciated that if the authentication of the UE fails (i.e., the RES value does not equal XRES), the network may reject the attach request and no computing resource is wasted on performing expensive asymmetric crypto operations. This helps alleviate any denial of service attacks by malicious UEs. The shared key is then bound to the $K_{ASME}$ value (e.g., the session key) received from the HSS 208 and the bound key is used to protect all subsequent NAS traffic. For example, a bound key may be designated as K'$_{ASME}$ (e.g., $K_{ASME}$-prime) and may be generated based on a key derivation function (KDF) of $K_{ASME}$ and the shared key. That is, K'$_{ASME}$=KDF ($K_{ASME}$, sharedDHEkey). The KDF may be a cryptographic hashing function (e.g., SHA256, SHA512, SHA3, etc. . . . ). The resulting K'$_{ASME}$ value may be used as the $K_{ASME}$ value in the subsequent LTE security procedures.

The MME 206 also sends a PFS NAS SMC message 520, including the MME public key (i.e., DHEpubKey$_{MME}$), as well as confidentiality and integrity algorithms. For example, the PFS NAS SMC message 520 may contain replayed UE security capabilities, selected NAS algorithms, the $KSI_{ASME}$ value for identifying $K_{ASME}$, and both $NONCE_{UE}$ and $NONCE_{MME}$ values in the case of creating a mapped context in idle mobility. The PFS NAS SMC message 520 may be integrity protected (but not ciphered) with NAS integrity key based on $K_{ASME}$ indicated by the $KSI_{ASME}$ value in the message. The UE 202 is configured to verify the integrity of the PFS NAS SMC message 520. This may include ensuring that the UE security capabilities sent by the MME match the ones stored in the UE to ensure that these were not modified by an attacker and checking the integrity protection using the indicated NAS integrity algorithm and the NAS integrity key based on $K_{ASME}$ indicated by the $KSI_{AMSE}$ value. At stage 532, the UE 202 is configured to derive the Diffie-Hellman shared key (e.g., sharedDHEkey) based on the MME public key (e.g., $DHEpubKey_{MME}$). The sharedDHEkey is then bound to the $K_{ASME}$ value (e.g., as identified by the $KSI_{ASME}$ value) to create the $K'_{ASME}$ as described above. The resulting $K'_{ASME}$ value may be used as the $K_{ASME}$ value in all subsequent LTE security procedures.

If the checks of the based on the PFS NAS SMC message 520 pass (i.e., the UE security capabilities sent by the MME match the ones stored in the UE, and the integrity protection uses the indicated NAS integrity algorithm and the NAS integrity key based on $K_{ASME}$ indicated by the $KSI_{AMSE}$ value), the UE 202 is configured to respond with a PFS NAS Security Mode Complete message 522. The UE 202 is configured to execute NAS integrity protection and ciphering/deciphering based on $K'_{ASME}$, and to send the PFS NAS security mode complete message 522 to MME 206 ciphered and integrity protected (e.g., based on $K'_{ASME}$). The MME 206 is configured to de-cipher and check the integrity protection on the PFS NAS Security Mode Complete message 522 using keys based on $K'_{ASME}$ and other algorithms indicated in the PFS NAS SMC message 520.

Figure 6:
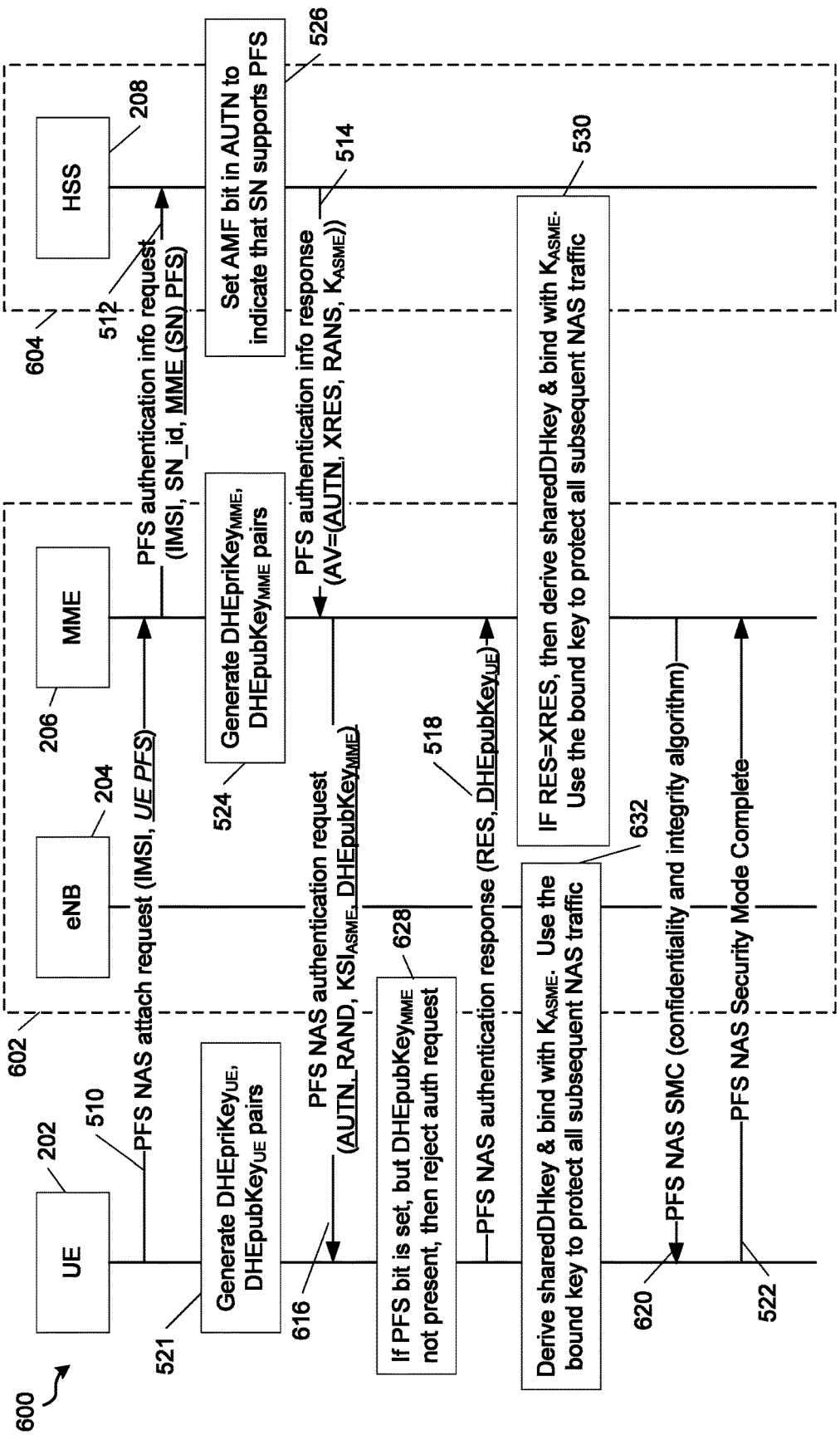
FIG. 6 is a call flow diagram of another example authentication procedure with a perfect forward secrecy (PFS) property.

Referring to FIG. 6, with further reference to FIGS. 2, 4 and 5, a call flow diagram 600 of another example authentication procedure with perfect forward secrecy (PFS) is shown. The diagram 600 represents an alternative security procedures which may be used by a communication system 200, thus the diagram 600 includes a UE 202 (e.g., a mobile device 100), a network 602, and a home network 604. The network 602 may include an eNodeB (eNB) 204 and an MME 206. The home network 604 includes at least the HSS 208 that is assumed to support AKA with a PFS property. The call flow diagram 600 improves the authentication and key agreement (AKA) procedure described in FIG. 4 by adding a perfect forward secrecy (PFS) property. The diagram 600 also includes some of the messages previously described in FIG. 5. For example, the UE 202 may be configured to send the PFS NAS attach request 510 to the MME 206. Upon receipt of the request, the MME 206 is configured to request authentication vectors from the home network 604 (e.g., the HSS 208). The MME 206 generates the PFS authentication info request message 512 (e.g., including the MME (SN) PFS informational element) and provides it to the home network 604. The home network 604 (e.g. the HSS 208) is configured to receive the PFS authentication info request message 512 and determine if the network 602 support the PFS property. If PFS is supported, at stage 526 the HSS 208 is configured to generate the authentication token (AUTN) including the PFS bit discussed in FIG. 5. If the network 602 does not support the PFS property, then the PFS bit is set to an value to indicate that PFS is not supported and the standard AKA protocol will be used (e.g., the Boolean bit is set to zero). The HSS 208 generates the PFS authentication info response message 514 including an Authentication Vector (AV). The AV in the PFS authentication info response message 514 includes the authentication token with the PFS bit described above, (AUTN), the expected response (XRES) value, the random number (RAND) value, and the Key Access Security Management Entity ($K_{ASME}$) value.

The UE 202 and the MME 206 are configured to generate respective pairs of public and private Ephemeral Diffie-Hellman (DHE) keys at stage 521 and 524, respectively. The UE 202 is configured to generate a UE private key value ($DHEpriKey_{UE}$) and a UE public key value ($DHEpubKey_{UE}$). The MME 206 is configured to generate a MME private key value ($DHEpriKey_{MME}$) and a MME public key value ($DHEpubKey_{MME}$). The private keys ($DHEpriKey_{UE}$, $DHEpriKey_{MME}$) are typically generated using a cryptographically secure pseudo-random number generator (CSPRNG), but other confidential information available to the respective systems may be used. The corresponding public keys may be generated in a similar non-deterministic manner by the respective systems. The DHE key pairs may be selected and generated (e.g., precomputed) in advance by the UE 202 and the MME 206 to reduce the impact of a potential network attack (e.g., processing delays due to generating the DHE keys). It should be noted that the MME may generates its DHE pairs any time before stage 524 and the UE may generates its DHE pairs at any time before stage 521.

The UE 202 and the MME 206 are configured to exchange their public keys during AKA authentication procedures and each derive a shared key (e.g., sharedDHkey). In contrast to the PFS NAS authentication request message 516 in FIG. 5, in the call flow in FIG. 6 the MME 206 generates a PFS NAS authentication request message 616 including the AUTN and RAND values received from the HSS 208, the NAS Key Set Identifier ($KSI_{ASME}$) based on the received $K_{ASME}$ value, as well as the MME public key (i.e., $DHEpubKey_{MME}$). At stage 628, the UE 202 is configured to determine if the PFS bit in AUTN value indicates the PFS property is supported, and determine if the MME public key (i.e., $DHEpubKey_{MME}$) is present in the PFS NAS authentication request message 616.

The UE 202 is also configured to determine if the AUTN value is fresh, as previously described. If the AUTN value is accepted, and the PFS bit is set, and then the MME public key (i.e., $DHEpubKey_{MME}$) is present, then the UE 202 computes a RES value and provides a PFS NAS authentication response message 518 to the MME 206, including the RES value and the UE public key value (i.e., $DHEpubKey_{UE}$). If the AUTN value is accepted, but the PFS bit is not set (e.g., value of zero) and the MME public key (i.e., $DHEpubKey_{MME}$) is not present, then the UE 202 may decide to abort the connection procedures with the network that does not support PFS property or may compute and send the RES in accordance with standard AKA procedures (e.g., the UE sends the NAS authentication response message 418 described in FIG. 4). If the PFS bit is set but the MME public key (i.e., $DHEpubKey_{MME}$) is not present, or the AUTN verification fails (e.g., regardless of PFS value and the presence of the MME public key), the UE 202 sends an authentication failure message to the MME 206. In an example, the failure message may include a CAUSE value indicating the reason for the failure.

At stage 530 the MME 206 is configured to determine if the RES value equals the XRES value, and then derive a Diffie-Hellman shared key (i.e., sharedDHEkey) based on the received UE public key (i.e., DHEpubKey$_{UE}$ in the PFS NAS authentication response message 518). The shared key is then bound to the K$_{ASME}$ value received from the HSS 208 and the bound key is used to protect all subsequent NAS traffic. For example, a bound key may be designated as K'$_{ASME}$ (e.g., K$_{ASME}$-prime) and may be generated based on a key derivation function (KDF) of K$_{ASME}$ and the shared key. That is, K'$_{ASME}$=KDF (K$_{ASME}$, sharedDHEkey). The KDF may be a cryptographic hashing function (e.g., SHA256, SHA512, SHA3, etc. . . . ). The resulting K'$_{ASME}$ value may be used as the K$_{ASME}$ value in the LTE network. At stage 632, the UE 202 is configured to derive the Diffie-Hellman shared key (e.g., sharedDHEkey) based on the MME public key (e.g., DHEpubKey$_{MME}$). The shared-DHEkey is then bound to the K$_{ASME}$ value (e.g., as identified by the KSI$_{ASME}$ value) to create the K'$_{ASME}$ as described above. The resulting K'$_{ASME}$ value may be used as the K$_{ASME}$ value in the subsequent LTE security procedures.

The MME 206 sends a PFS NAS SMC message 620, including confidentiality and integrity algorithms. For example, the PFS NAS SMC message 620 may contain replayed UE security capabilities, selected NAS algorithms, and both NONCE$_{UE}$ and NONCE values in the case of creating a mapped context in idle mobility. In an embodiment, the PFS NAS SMC message 620 may be integrity protected (but not ciphered) with NAS integrity key based on K'$_{ASME}$ determined at stage 530. The UE 202 is configured to verify the integrity of the PFS NAS SMC message 620. This may include ensuring that the UE security capabilities sent by the MME match the ones stored in the UE to ensure that these were not modified by an attacker and checking the integrity protection using the indicated NAS integrity algorithm and the NAS integrity key based on K'$_{ASME}$ derived at stage 632.

If the checks of the based on the PFS NAS SMC message 620 pass (e.g., the UE security capabilities sent by the MME match the ones stored in the UE, and the integrity protection uses the indicated NAS integrity algorithm and the NAS integrity key based on K'$_{ASME}$), the UE 202 is configured to respond with a PFS NAS Security Mode Complete message 522. The UE 202 is configured to execute NAS integrity protection and ciphering/deciphering based on K'$_{ASME}$, and to send the PFS NAS security mode complete message 522 to MME 206 ciphered and integrity protected. The MME 206 is configured to de-cipher and check the integrity protection on the PFS NAS Security Mode Complete message 522 using keys based on K'$_{ASME}$ and other algorithms indicated in the PFS NAS SMC message 620.

In addition to including the security aspects associated with the PFS property, the call flow examples provided in FIGS. 5 and 6 provide protection to bid-down attacks (e.g., man-in-the-middle attacks wherein an malicious entity modifies the message exchange). That is, the call flows prevent a man-in-the-middle from bidding down from the "AKA with PFS" procedure to an "AKA without PFS" procedure. When the subscriber's home network (e.g., the HSS 208) supports PFS, it is implied that the HSS understands the indications received from the MME (e.g., the MME (SN) PFS informational element) and may set a PFS bit in the AMF filed in the authentication token (AUTN) during AKA authentication vector (AV) generation. Generally, if a network (e.g., an MME) supports PFS, it indicates its PFS support to a home network (e.g., an HSS) as part of the AV request. This indication is included to the HSS even if the UE does not indicate PFS support in the attach request. The HSS sets an AMF bit (e.g., the PFS bit) in the AUTN. The AUTN is integrity protected between the HSS and the UE. A UE that supports PFS is configured to check whether the PFS bit is set in the AUTN. If the PFS bit is set, but AKA is performed without PFS, then the UE will reject the authentication. A UE which does not support PFS may ignore the bit checking. If a network (e.g., an MME) does not support PFS (i.e., the PFS bit is set to zero in the AV), then a UE policy may be invoked to determine whether the UE continues authentication without PFS with the network.

Figure 7:
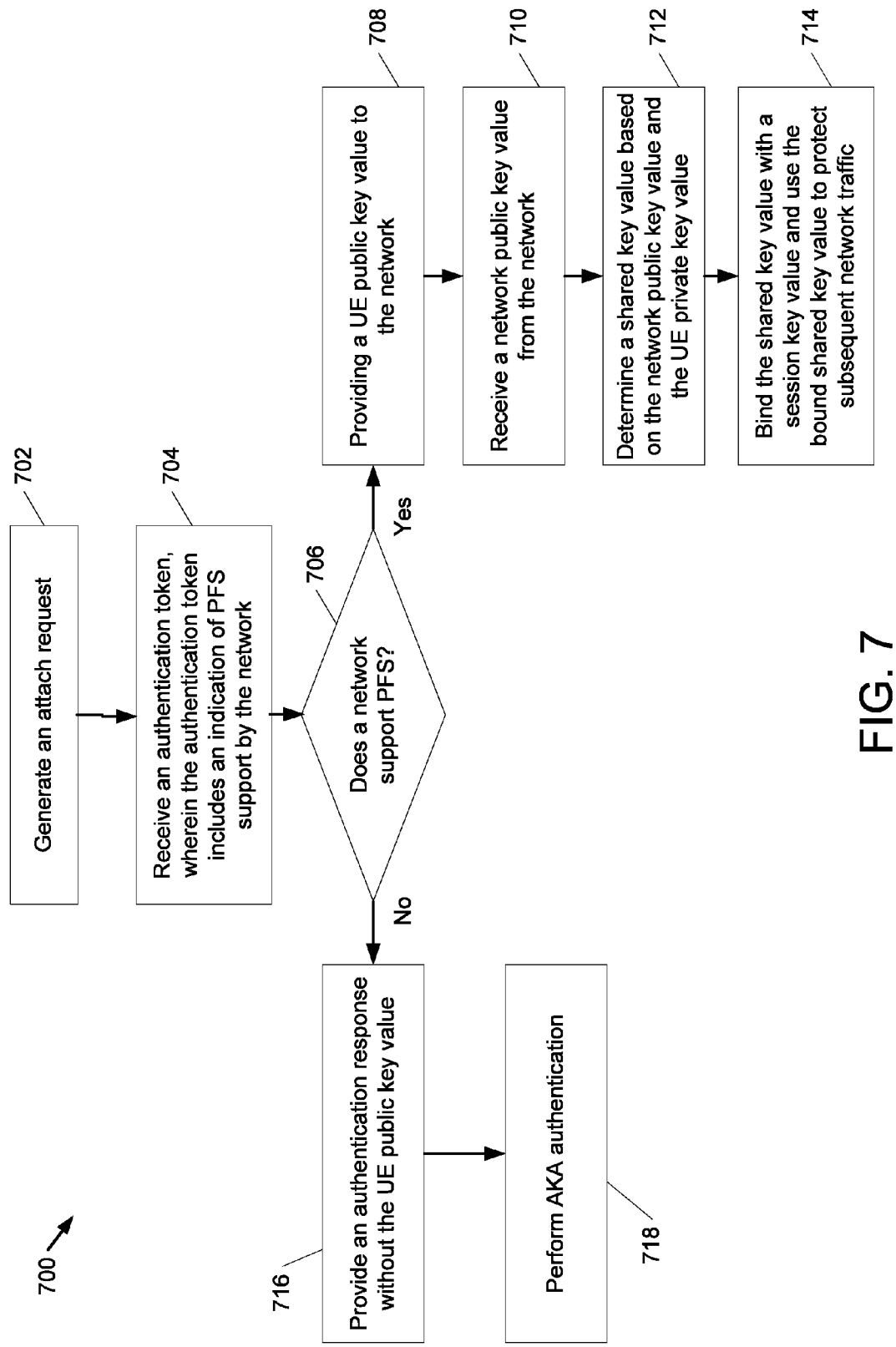
FIG. 7 is a block flow diagram of a process of providing secure communications with a mobile device according to some aspects/embodiments.

Referring to FIG. 7, with further reference to FIGS. 1-6, a process 700 for providing secure communications with a mobile device includes the stages shown. The process 700 is, however, an example only and not limiting. The process 700 can be altered, e.g., by having stages added, removed, rearranged, combined, and/or performed concurrently. For example, the UE public key and the UE private key may be previously computed. The process 700 may execute on the mobile device 100 which is also an example of a UE 202 in the communication system 200.

At stage 702, the processor 111 and the wireless transceiver 121 in the mobile device 100 are configured generate an attach request. In an embodiment, the attach request may include a PFS support indicator. The processor 111 and the wireless transceiver 121 are a means for generating an attach request. An attach request may be a wireless communication between the mobile device 100 and a communication network, such as LTE, LTE-A, HSPA, CDMA, high rate packet data (HRPD), evolved HRPD (eHRPD), CDMA2000, GSM, GPRS, enhanced data rate for GSM evolution (EDGE), UMTS, or the like. The communication system may utilize a 'AKA with PFS' protocol to secure the message flow in the network. Generating an attach request can be sending the PFS NAS attach request 510 from the mobile device to the MME 206 via the eNB 204. The PFS support attach request may optionally include a Boolean bit, or any data type, such as the optional UE PFS information element in the PFS NAS attach request 510.

At stage 704, the processor 111 and the wireless transceiver 121 in the mobile device 100 are configured to receive an authentication request with an authentication token, such that the authentication token includes an indication of PFS support by the serving cell. The value of the authentication token is based, at least in part, on a network support indicator (e.g., MME PFS). That is, the authentication token is configured to indicate whether or not the network supports PFS. For example, the indication of PFS support by the network may be the AUTN field in the PFS authentication info response message 514. The authentication token may include a data field (e.g., bit, bytes) as the indication that a network supports PFS (e.g., the PFS bit in the AUTN).

At stage 706, the processor 111 in the mobile device 100 is configured to determine if a network supports perfect forward secrecy (PFS). The authentication token received at stage 704 may include a PFS bit (e.g., an AMF bit) to indicate whether or not the network supports PFS. If the network does not support PFS (i.e., PFS bit equals zero), then at stage 716 the mobile device 100 is configured to provide an authentication response without the UE public key value. For example, referring to FIG. 4, the authentication response may be the NAS authentication response message 418. At stage 718, the mobile device 100 is configured to perform the standard AKA authentication procedure, such as depicted in FIG. 4.

If the mobile device 100 determines that the network supports PFS (e.g., the PFS bit in the AUTN equals 1), then the processor 111 in the mobile device 100 is configured to provide the UE public key value to the network (e.g., in an authentication response) at stage 708. The processor 111 and the wireless transceiver 121 are a means for providing the UE public key value to the network. For example, the processor 111 is configured to generate a UE public key value and a UE private key value. The public and private keys are generated as Diffie-Hellman pairs. The processor 111 is a means for generating UE private and public keys. The processor 111 may be configured to generate a cryptographically secure pseudo-random number generator (CSPRNG) as the UE private key value. A UE public key value is also be generated in a non-deterministic way by the processor 111. The UE private and public key values may be generated prior to the execution of the process 700, and stored in memory on the mobile device and retrieved as required. In the LTE example in FIG. 5, the mobile device 100 may and provide the PFS NAS authentication response message 518 to the MME 206, including a RES value and the UE public key value (i.e., DHEpubKey$_{UE}$).

At stage 710, the wireless transceiver 121 and the processor 111 in the mobile device are configured to receive a network public key value from the network. For example, the mobile device 100 may be configured to receive a PFS NAS SMC message 520 from the network 502 (e.g., from the MME 206 via the eNB 204). The PFS NAS SMC message 520 may include the network public key (e.g., DHEpubKey), as well as confidentiality and integrity algorithms.

At stage 712, the processor 111 in the mobile device 100 is configured to determine a shared key value based on the network public key value and the UE private key value. For example, the processor 111 is configured to derive a Diffie-Hellman shared key (i.e., sharedDHEkey) based on the received network public key value (i.e., DHEpubKeyMME) and the previously generated UE private key value (DHEpriKey$_{UE}$).

At stage 714, the processor 111 in the mobile device 100 is configured to bind the shared key value with a session key value and use the bound shared key value to protect subsequent network traffic. Binding the shared key value with the session key value may include performing a cryptographic hash on the concatenation of the shared key value with the session key value (e.g., SHA256(shared key, root key)). Referring to FIG. 5, the shared key value (i.e., sharedDHEkey) is bound to the K$_{ASME}$ value. The resulting bound shared key value is designated as K'$_{ASME}$ and may be generated based on a key derivation function (KDF) of K$_{ASME}$ and the shared key. That is, K'$_{ASME}$=KDF (K$_{ASME}$, sharedDHEkey). The KDF may be a cryptographic hashing function (e.g., SHA256, SHA512, SHA3, etc. . . . ). The resulting K'$_{ASME}$ value (i.e., the bound shared key value) is used as the K$_{ASME}$ value in the LTE network. That is, the bound shared key value is used to protect subsequent network traffic.

Figure 8:
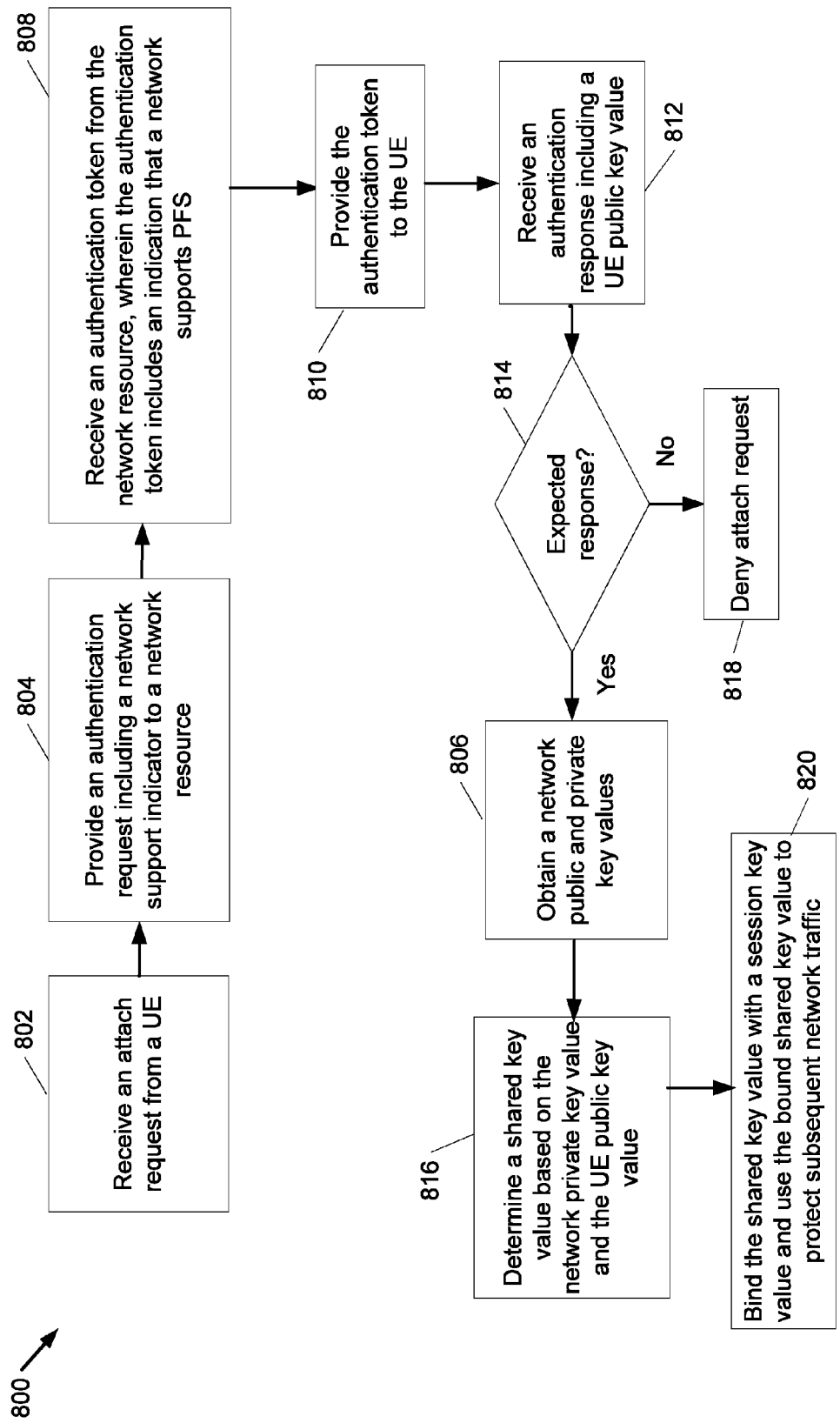
FIG. 8 is a block flow diagram of a process of providing secure communications with a network server according to some aspects/embodiments.

Referring to FIG. 8, with further reference to FIGS. 1-6, a process 800 for providing secure communications with a network server includes the stages shown. The process 800 is, however, an example only and not limiting. The process 800 can be altered, e.g., by having stages added, removed, rearranged, combined, and/or performed concurrently. For example, network public and private key values may be precomputed and stored in memory and retrieved as required by the process 800. The process 800 may execute on the computer system 300 which is also an example of a MME 206 in the communication system 200.

At stage 802, the communications subsystem 330 and the processor(s) 310 in the computer system 300 are configured to receive an attach request from a UE. In an example, the attach request may include an optional PFS support indicator. A network 502 may include a computer system 300 as a means for receiving an attach request. In the LTE example in FIG. 5, the network 502 receives the PFS NAS attach request 510 from a UE 202. The PFS NAS attach request includes identifying information (e.g., IMSI) and may optionally include a UE PFS Information Element (IE). The optional UE PFS IE is a data field (e.g., Boolean bit, or other character) configured to indicate that the UE 202 supports the PFS property. The PFS NAS attach request 510 is sent from the UE 202 to the MME 206.

At stage 804, the communications subsystem 330 and the processor(s) 310 in the computer system 300 are configured to provide an authentication request including a network support indicator to a network resource. The standard AKA procedures require a network (e.g., an MME) to request an authentication vector from the home network (e.g., HSS). The addition of PFS to the AKA protocol improves the strength of the security on the communication system 200. It is assumed that a UE's home network support PFS. Since there are potentially many different networks available to a UE, however, it is possible that a UE may attach to a network which does not support PFS. It is therefore also possible that a man-in-the-middle may attempt to bid down the requested 'AKA with PSF' protocol to an 'AKA without PFS' protocol. The process 800 may eliminate this risk by requiring the network to indicate its ability to support PFS to the home network. In the LTE example, this indication is included in the PFS authentication info request message 512 as an indication that the network supports a PFS property (e.g., the MME (SN) PFS informational element). The authentication request is typically a diameter protocol message with Attribute Value Pairs (AVP) as informational elements, but in other networks other data value or types may be used to indicate that a network supports the PFS property.

At stage 808, the communications subsystem 330 and the processor(s) 310 are configured to receive an authentication token from the network resource, such that the authentication token includes an indication that the network supports PFS. In response to receiving the authentication request provided at stage 804, the network resource may response with one or more authentication vectors. The authentication vectors include an authentication token that is integrity protected between the network resource and the UE. The value of the authentication token is based, at least in part, on the network support indicator. That is, the authentication token is configured to indicate whether or not the network (e.g., the network that provided the authentication request at stage 804) supports PFS. For example, the authentication token may be the AUTN field in the PFS authentication info response message 514. The authentication token may include a data field (e.g., bit, bytes) as the indication that a network supports PFS (e.g., the PFS bit in the AUTN).

At stage 810, the communications subsystem 330 and the processor(s) 310 are configured to provide the authentication token to the UE. In the LTE example, the authentication token may be provided via a RAT (e.g., eNB 204) and included in one of the PFS NAS authentication request messages 516, 616 (i.e., the AUTN value). At stage 812, the network is configured to receive an authentication response including a UE public key value. The communications subsystem 330 in the computer 300 is a means for receiving an authentication response. For example, the authentication response may be the PFS NAS authentication response message 518 including the RES value and the UE public key value (i.e., DHEpubKey$_{UE}$).

At stage 814, the processor(s) 310 are configured to determine if the authentication response received in stage 812 is an expected response. An expected response, for example, is one in which a response value (e.g., RES) equals a previously stored expected response value (e.g., XRES). In the LTE example, the RES value is included in the PFS NAS authentication response message 518, and the XRES value was included in an authentication vector received from the network resource. The processor(s) 310 are configured to perform a logical comparison operation on the two values. If they do not match, the UE's attach request is denied at stage 818.

At stage 806, the processor(s) 310 in the computer system 300 are configured to generate a network public key value and a network private key value. The network public and private key values may be Diffie-Hellman pairs that are generated using elliptic-curve cryptography. Other non-deterministic methods (e.g., the results of a CSPRNG) may also be used to generate the keys. A collection of keys may be pre-generated prior to the execution of the process 800 and stored in a memory. A pair of keys may be retrieved from memory as required by the process 800.

At stage 816, the processor(s) 310 are configured to determine a shared key value based on the network private key value and the UE public key value. The shared key value is a Diffie-Hellman shared key (i.e., sharedDHEkey) based on the received UE public key (i.e., $DHEpubKey_{UE}$) received at stage 812 and the network private key generated at stage 806.

At stage 820, the processor(s) 310 are configured to bind the shared key value with a session key value and used the bound shared key value to protect subsequent network traffic. In general, a session key value is derived from a symmetric root key that is shared between the UE and the network resource. An example of a session key in the AKA procedures is the $K_{ASME}$ key value. The shared key value may be bound to the session key value (e.g., $K_{ASME}$) via a key derivation function (KDF). The KDF may be a cryptographic hashing function (e.g., SHA256, SHA512, SHA3, etc. . . . ). Other binding algorithms may also be used. In the LTE example described in FIG. 5, the bound shared key is $K'_{ASME}$, which is generated with a KDF function (e.g., $K'_{ASME}$=KDF ($K_{ASME}$, sharedDHEkey)). The resulting $K'_{ASME}$ value may be used as the $K_{ASME}$ value to protect subsequent traffic in the LTE network.

Referring to FIG. 9, with further reference to FIGS. 1-6, a process 900 for preventing a bid-down attack on a system with a strong security protocol includes the stages shown. The process 900 is, however, an example only and not limiting. The process 900 can be altered, e.g., by having stages added, removed, rearranged, combined, and/or performed concurrently. The process 900 may execute on the computer system 300 which is included in the network 502.

At stage 902, the communications subsystem 330 and the processor(s) 310 in the computer system 300 are configured to receive an attach request from a user equipment. In an example, a strong security protocol supports a PFS property. Therefore, in a relative comparison, an AKA procedure which supports PFS is stronger than an AKA procedure which does not support PFS. In the LTE example, the UE 202 is configured to send a PFS NAS attach request 510 to a computer system 300.

At stage 904, the communications subsystem 330 and the processor(s) 310 in the computer system 300 are configured send an authentication request to a home network, such that the authentication request includes an indication that the network supports a strong security protocol. In an example, the computer system 300 is configured to request authentication vectors from the home network, and generate an authentication request including the security information associated with the user equipment (e.g., IMSI), and data fields indicating a network type (e.g., E-UTRAN), and an indication that the network supports the strong security protocol. The PFS authentication info request message 512 is an example of the authentication request sent at stage 904. The corresponding MME (SN) PFS informational element is an example of an indication that the network supports the strong security protocol (e.g., AKA with PFS). The authentication request helps prevent a man-in-the-middle (MiM) from bidding down the AKA with PFS to a standard AKA protocol. In an example, a MiM (e.g., a station) which might intercept the attach request received at stage 902 cannot merely forward that attach request to the home network because the resulting forwarded message would not include an indication that the network supports the strong security protocol (e.g., AKA with PFS).

At stage 906, the communications subsystem 330 and the processor(s) 310 in the computer system 300 are configured to receive an integrity protected token from the home network, such that the integrity protected token includes at least one bit configured to indicate that the network supports the strong security protocol. The integrity protected token provides integrity protection between the user equipment and the home network. In the LTE example, the authentication token AUTN is integrity protected token. In the AUTN, a field in the Authentication Management Field (AMF) may be set to indicate that the network supports the PFS property (e.g., a Boolean bit is set to 1). The PFS bit in the AUTN is an example of the at least one bit configured to indicate that the network supports the strong security protocol. For example, if a network supports the strong security protocol, the PFS bit may be set to a value to indicate that the strong security protocol is supported (e.g., the PFS bit is set to 1). Conversely, if the strong security protocol is not supported by the network, the PFS bit may be set to zero.

At stage 908, the communications subsystem 330 and the processor(s) 310 in the computer system 300 are configured to send the integrity protected token to the user equipment. The user equipment may be configured to parse the at least one bit from the integrity protection token to determine if the network supports the strong security protocol. In the LTE example described in FIG. 5, user equipment may be configured to determine if the PFS bit in the AUTN value indicates the PFS property is supported. If the PFS bit is set (and the other authentication values are valid), then the user equipment provides a Diffie-Hellman public key to the network. The public key is a component of the strong security protocol which is not required for a relatively weaker security protocol (e.g., AKA without PFS). If the PFS bit in the integrity protected token is not set (e.g., value of zero), then the user equipment may be configured to respond in accordance with the weaker security protocol. Since the integrity protected token provides protection between the user equipment and the home network, the strong security protocol cannot by bid-down to the weak security protocol because a man-in-the-middle cannot change the value of the integrity protected token.

Authentication procedures with a PFS property are not limited to the call flows depicted in FIGS. 5 and 6. For example, in mobility scenarios, a UE may start a Service Request or Location Area Update or Tracking Area Update (TAU) Request messages instead of the PFS NAS attach request 510. The UE may optionally indicate its PFS support in these messages (e.g., by including a UE PFS IE). Thus, if the MME has changed or MME decides to initiate a new AKA, then a new AKA with PFS property may be performed as needed. Furthermore, PFS property may be implemented for Access Stratum (AS) security. Similar to $K_{ASME}$ (and other NAS security keys), the Ephemeral DHE methods described above may be used to set up AS security keys with a PFS property between the eNB and the UE. The $K_{eNB}$ and other AS security keys may be bound to a sharedDHEkey derived between the $K_{eNB}$ and the UE. For example, eNB 204 and UE 202 may exchange DHE public keys using an RRC message exchange (e.g. RRCConnectionSetupComplete and RRC Security Mode Command) to exchange respective Diffie-Hellman public keys and set up AS security keys with a PFS property. This implementation of a PFS property prevents compromise of confidentiality of past over-the-air (OTA) traffic between the UE and the eNB if the NAS level keys (e.g. $K_{ASME}$) which are used to derive AS security keys are compromised in the future. This may happen as the UE transitions between Idle and Active modes, or when the UE moves to a different eNB during idle mode mobility.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

A computer system (such as the computer system 300) may be used to perform methods in accordance with the disclosure. Some or all of the procedures of such methods may be performed by the computer system 300 in response to processor 310 executing one or more sequences of one or more instructions (which might be incorporated into the operating system 340 and/or other code, such as an application programs 345) contained in the working memory 335. Such instructions may be read into the working memory 335 from another computer-readable medium, such as one or more of the storage device(s) 325. Merely by way of example, execution of the sequences of instructions contained in the working memory 335 might cause the processor(s) 310 to perform one or more procedures of the methods described herein.

The terms "machine-readable medium" and "computer-readable medium," as used herein, refer to any medium that participates in providing data that causes a machine to operate in a specific fashion. In an embodiment implemented using the mobile device 100 and/or the computer system 300, various computer-readable media might be involved in providing instructions/code to processor(s) 111, 310 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 140, 325. Volatile media include, without limitation, dynamic memory, such as the working memory 140, 335. Transmission media include, without limitation, coaxial cables, copper wire and fiber optics, including the wires that comprise the bus 101, 305, as well as the various components of the communications subsystem 330 (and/or the media by which the communications subsystem 330 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, a Blu-Ray disc, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 111, 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the mobile device 100 and/or computer system 300. These signals, which might be in the form of electromagnetic signals, acoustic signals, optical signals and/or the like, are all examples of carrier waves on which instructions can be encoded, in accordance with various embodiments of the invention.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for preventing a bid-down attack on a system with a perfect forward secrecy, the method comprising:
   receiving an attach request from a user equipment;
   sending an authentication request to a home network, wherein the authentication request includes an indication that a network supports the perfect forward secrecy;
   receiving an integrity protected token from the home network, wherein the integrity protected token includes at least one bit configured to indicate that the network supports the perfect forward secrecy; and
   sending the integrity protected token to the user equipment.

2. The method of claim 1 wherein the attach request includes an indication that the user equipment supports the perfect forward secrecy.

3. The method of claim 1 wherein the authentication request is a diameter protocol message with Attribute Value Pairs (AVP) as information elements to indicate that the network supports the perfect forward secrecy.

4. The method of claim 1 wherein the integrity protected token is included in an authentication vector received from the home network.

5. The method of claim 4 wherein the at least one bit is included in an Authentication Management Field (AMF).

6. A non-transitory processor-readable storage medium comprising instructions for preventing a bid-down attack on a system with a perfect forward secrecy, the instructions comprising:
   code for receiving an attach request from a user equipment;
   code for sending an authentication request to a home network, wherein the authentication request includes an indication that a network supports the perfect forward secrecy;
   code for receiving an integrity protected token from the home network, wherein the integrity protected token includes at least one bit configured to indicate that the network supports the perfect forward secrecy; and
   code for sending the integrity protected token to the user equipment.

7. The non-transitory processor-readable storage medium of claim 6 wherein the attach request includes an indication that the user equipment supports the perfect forward secrecy.

8. The non-transitory processor-readable storage medium of claim 6 wherein the authentication request is a diameter protocol message with Attribute Value Pairs (AVP) as information elements to indicate that the network supports the strong perfect forward secrecy security protocol.

9. The non-transitory processor-readable storage medium of claim 6 wherein the integrity protected token is included in an authentication vector received from the home network.

10. The non-transitory processor-readable storage medium of claim 9 wherein the at least one bit is included in an Authentication Management Field (AMF).

11. An apparatus for preventing a bid-down attack on a system with a perfect forward secrecy, comprising:
    a memory;
    at least one processor operably coupled to the memory and configured to:
    receive an attach request from a user equipment;
    provide an authentication request to a home network, wherein the authentication request includes an indication that a network supports the perfect forward secrecy;
    receive an integrity protected token from the home network, wherein the integrity protected token includes at least one bit configured to indicate that the network supports the perfect forward secrecy; and
    provide the integrity protected token to the user equipment.

12. The apparatus of claim 11 wherein the attach request includes an indication that the user equipment supports the perfect forward secrecy.

13. The apparatus of claim 11 wherein the authentication request is a diameter protocol message with Attribute Value Pairs (AVP) as information elements to indicate that the network supports the strong se perfect forward secrecy.

14. The apparatus of claim 11 wherein the integrity protected token is included in an authentication vector received from the home network.

15. The apparatus of claim 14 wherein the at least one bit is included in an Authentication Management Field (AMF).

16. An apparatus for preventing a bid-down attack on a system with a perfect forward secrecy, comprising:
    means for receiving an attach request from a user equipment;
    means for providing an authentication request to a home network, wherein the authentication request includes an indication that a network supports the perfect forward secrecy;
    means for receiving an integrity protected token from the home network, wherein the integrity protected token includes at least one bit configured to indicate that the network supports the perfect forward secrecy; and
    means for providing the integrity protected token to the user equipment.

17. The apparatus of claim 16 wherein the attach request includes an indication that the user equipment supports the perfect forward secrecy.

18. The apparatus of claim 16 wherein the authentication request is a diameter protocol message with Attribute Value Pairs (AVP) as information elements to indicate that the network supports the strong security perfect forward secrecy protocol.

19. The apparatus of claim 16 wherein the integrity protected token is included in an authentication vector received from the home network.

20. The apparatus of claim 19 wherein the at least one bit is included in an Authentication Management Field (AMF).

* * * * *